US010179480B2

(12) United States Patent
Phely et al.

(10) Patent No.: US 10,179,480 B2
(45) Date of Patent: Jan. 15, 2019

(54) SEMI-HOLLOW PNEUMATIC TIRE FOR AGRICULTURAL MACHINES, IN PARTICULAR FOR SOWING MACHINES

(71) Applicant: OTICO, Chalmaison (FR)

(72) Inventors: Olivier Phely, Thenisy (FR); Denis Piou, Villeblevin (FR)

(73) Assignee: OTICO, Chalmaison (FR)

( * ) Notice: Subject to any disclaimer, the term of this patent is extended or adjusted under 35 U.S.C. 154(b) by 728 days.

(21) Appl. No.: 14/249,886

(22) Filed: Apr. 10, 2014

(65) Prior Publication Data
US 2014/0305561 A1 Oct. 16, 2014

(30) Foreign Application Priority Data

Apr. 12, 2013 (FR) ...................................... 13 53332

(51) Int. Cl.
*A01C 5/06* (2006.01)
*B60C 7/12* (2006.01)
(Continued)

(52) U.S. Cl.
CPC ............... *B60C 3/02* (2013.01); *A01C 5/066* (2013.01); *B60C 7/12* (2013.01); *B60C 7/24* (2013.01);
(Continued)

(58) Field of Classification Search
CPC .. A01C 5/06; A01C 5/066; B60C 7/12; B60C 7/24; B60C 7/10; B60C 13/003; B60C 3/02; B60C 11/11; B60C 11/0311
See application file for complete search history.

(56) References Cited

U.S. PATENT DOCUMENTS 1,092,078 A * 3/1914 Overman .................. B60C 7/12
152/325
1,342,626 A 6/1920 Meyer
(Continued)

FOREIGN PATENT DOCUMENTS

DE 10154452 A1 * 5/2003
FR 438 929 5/1912
FR 2 933 903 1/2010

OTHER PUBLICATIONS

Machine translation for German 10154452 (no date).*
(Continued)

*Primary Examiner* — Steven D Maki
(74) *Attorney, Agent, or Firm* — Oblon, McClelland, Maier & Neustadt, L.L.P.

(57) ABSTRACT

The semi-hollow pneumatic tire has an axis of revolution and comprises a sole mountable on the periphery of a rotary support, a tread opposite the sole, and two sidewalls each connecting the sole and the tread so as to form together a cover which defines an uninflated chamber inside the pneumatic tire. The tread has a concave profile according to a plane passing through the axis of revolution, and the pneumatic tire comprises two annular ridges which extend, respectively, the two sidewalls in the outer radial direction and which are connected to two opposite ends of the tread, the two annular ridges defining, respectively, two principal directions which intersect at an acute angle so that, when the pneumatic tire comes into contact with soil, by being subjected to a vertical load, the two annular ridges move closer together locally.

17 Claims, 8 Drawing Sheets

(51) Int. Cl.
*B60C 11/11* (2006.01)
*B60C 3/02* (2006.01)
*B60C 11/03* (2006.01)
*B60C 7/24* (2006.01)
*B60C 13/00* (2006.01)

(52) U.S. Cl.
CPC ........... *B60C 11/0311* (2013.01); *B60C 11/11* (2013.01); *B60C 13/003* (2013.01); *B60C 2200/08* (2013.01)

(56) References Cited

U.S. PATENT DOCUMENTS

| | | | | |
|---|---|---|---|---|
| 1,464,786 A | * | 8/1923 | Von Kothen | B60C 7/00 152/153 |
| 1,557,324 A | * | 10/1925 | Pestunowitz | B60C 7/12 152/325 |
| 1,560,551 A | * | 11/1925 | Eger | B60C 7/12 152/324 |
| 3,538,971 A | * | 11/1970 | Stewart | B60B 15/263 152/452 |
| 4,570,554 A | * | 2/1986 | Clark | A01C 5/068 111/196 |
| 2008/0230162 A1 | * | 9/2008 | Piou | B60C 11/0311 152/209.12 |
| 2010/0012247 A1 | * | 1/2010 | Phely | B60C 7/12 152/453 |
| 2013/0009452 A1 | | 1/2013 | Phely et al. | |

OTHER PUBLICATIONS

Preliminary Search Report dated Oct. 24, 2013 in FR 1353332 FA779832 (with English translation of Category of Cited Documents).

* cited by examiner

Fig.15
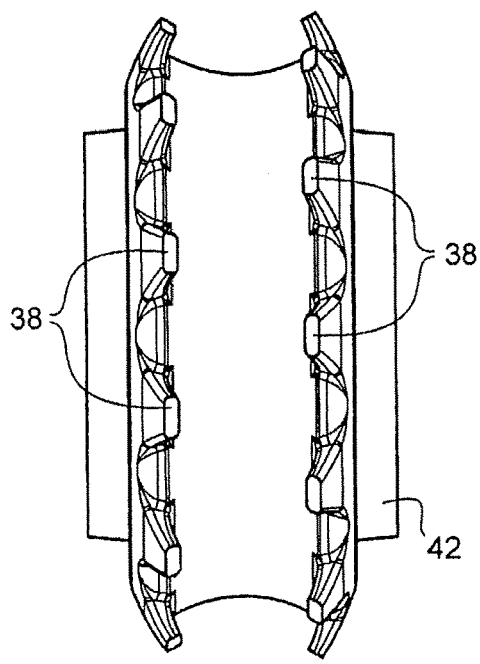
Fig.16
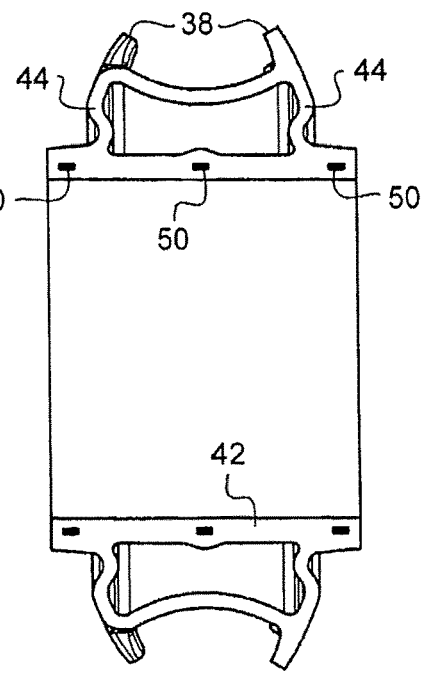
Fig.17
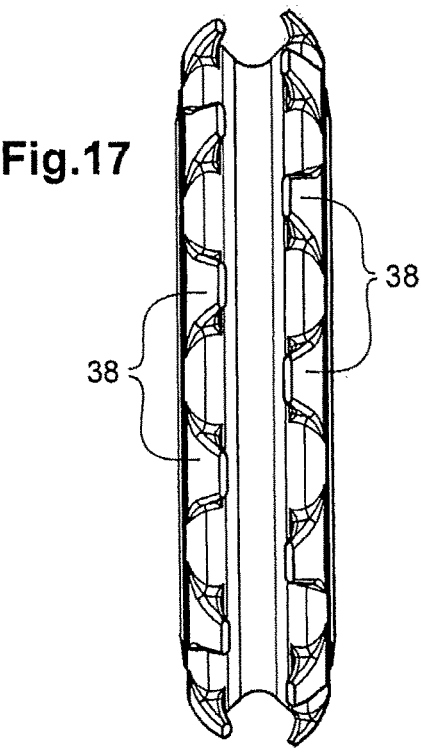
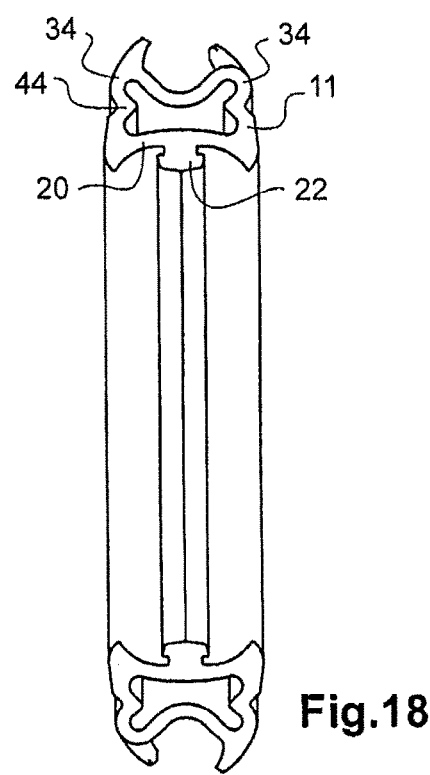
Fig.18

SEMI-HOLLOW PNEUMATIC TIRE FOR AGRICULTURAL MACHINES, IN PARTICULAR FOR SOWING MACHINES

The invention relates to a semi-hollow pneumatic tire for agricultural machines and in particular for sowing machines.

It relates principally to a semi-hollow pneumatic tire for an agricultural machine for closing a furrow previously created by a soil-working tool.

In agricultural machines of this type, a soil-working tool such as a ploughshare, a disk or a tooth creates a furrow in which grains or seeds are buried, the furrow subsequently being closed in order to allow the grains or seeds to germinate.

Such a working tool can be associated with a sowing-machine element or alternatively with another element, for example an element for distributing a fertilizer which must itself also be buried in the furrow.

In all cases, the problem arises of closing the furrow in order to allow either the grains or seeds to germinate or the fertilizer to be distributed in the soil.

There is known from publication FR 2 933 903 in the name of the Applicant a semi-hollow pneumatic tire having an axis of revolution and comprising a sole capable of being mounted on the periphery of a rotary support, a tread opposite the sole, and two sidewalls each connecting the sole and the tread so as to form together a cover which defines an uninflated chamber inside the pneumatic tire. The rotary support can be, for example, a wheel rim.

This semi-hollow pneumatic tire has a tread with a convex profile and is intended principally to equip a wheel for a sowing-machine element, in order to regulate the working depth of the element and/or to press down the soil after the element has passed.

This known pneumatic tire is mounted on a wheel rim in order to constitute a wheel for regulating the working depth of a sowing-machine element and/or for pressing down the soil after the element has passed.

Closing of furrows is generally carried out by inclined rotary elements which are arranged in pairs and the planes of which form a V.

They can be, for example, solid or toothed disks or toothed wheels as described in patent U.S. Pat. No. 5,443,023.

These known rotary elements are heavy and cumbersome and do not always manage effectively to perform their function of closing the furrows in all soil conditions.

The furrows to be closed can in fact be formed in soils of very different natures and under climate conditions which are also very different.

The invention proposes to find a solution to the problem of the closing of furrows, without using V-shaped pairs of rotary elements.

To that end it proposes a semi-hollow tire of the type defined above, as taught by publication FR 2 933 903, which has a special profile in order to allow a furrow to be closed, whatever the soil or ground conditions that are encountered.

According to the invention, the tread has a concave profile according to a plane passing through the axis of revolution, and the pneumatic tire comprises two annular ridges which extend the two sidewalls in the outer radial direction and which are connected to two opposite ends of the tread. The two ridges define two principal directions which intersect at an acute angle so that, when the pneumatic tire comes into contact with soil by being subjected to a vertical load, the two ridges move closer together locally so as to exert a pinching effect on the soil, causing an increase in the concavity of the tread and an increase in the above-mentioned angle.

Accordingly, the invention proposes a semi-hollow pneumatic tire having a particular profile which allows a furrow to be closed, which had never been effected hitherto.

The two annular ridges, which can also be described as annular ribs, accordingly form two rings which extend the two sidewalls beyond the tread.

Since the two annular ridges have principal directions which intersect at an acute angle, they move closer together under the effect of the load and exert a pinching effect on the soil.

This movement of moving closer together is also permitted by virtue of the tread, which has a concave profile and not a convex profile as in the prior art.

Strictly speaking, this tread does not constitute a tread but is a deformable part which allows the two ridges to move closer together, causing a pinching movement, this pinching movement being exerted in a generally horizontal direction.

In a preferred embodiment of the invention, each sidewall and the annular ridge that extends it are capable of pivoting jointly and locally under the effect of the vertical load about a pivot point situated in a connection region between the sidewall and the sole.

In other words, under the effect of the load, a general pivoting of the sidewall and of the annular ridge that extends it is obtained each time, which increases the pinching effect and the amplitude thereof.

In a first embodiment of the invention, each sidewall and the annular ridge that extends it have a profile of generally convex shape, according to a plane passing through the axis of revolution.

In another embodiment of the invention, each sidewall has a generally S-shaped profile according to a plane passing through the axis of revolution, the S-shaped profile having a convex outer portion, which is extended by an annular ridge, and a concave inner portion, which is connected to the sole.

The annular ridge can have different shapes.

In a first embodiment of the invention, each annular ridge has a smooth and continuous end edge.

In a second embodiment of the invention, each annular ridge comprises indentations.

The indentations can be produced, for example, in the form of teeth or of notches of substantially trapezoidal shape, or alternatively in the form of spikes substantially in the form of cylindrical sections.

The indentations can be aligned, or offset in directions parallel to the axis of revolution.

The sole of the pneumatic tire can have different types of profiles according to the nature of the rotary support on the periphery of which the semi-hollow tire is mounted.

Accordingly, when the pneumatic tire is to be mounted on the rim of a wheel to form an individual wheel, the sole can have a profile of concave shape according to a plane passing through the axis of revolution and can be provided with a retaining bead which projects in the inner radial direction.

The sole can also have a profile of generally planar shape according to a plane passing through the axis of revolution, in order to define a cylindrical sleeve.

In that case, the semi-hollow pneumatic tire can be slipped around a cylindrical tube to constitute a roller or the like. Such a roller may then receive a plurality of semi-hollow pneumatic tires which are suitably spaced apart in order simultaneously to close a plurality of furrows.

It will be appreciated that the nature of the sole does not actually constitute the subject-matter of the invention.

In the following description, which is given only by way of examples, reference will be made to the accompanying drawings, in which:

FIG. 15 is a front view of a pneumatic tire analogous to that of FIGS. 12 and 13 in a variant embodiment in which the sleeve has a different axial height;

FIG. 16 is a view in axial section of the pneumatic tire of FIG. 15;

FIG. 17 is a front view of a semi-hollow pneumatic tire comprising sidewalls with an S-shaped profile, annular ridges with offset indentations, and a sole with a concave profile;

FIG. 18 is a view in axial section of the pneumatic tire of FIG. 17;

FIG. 1 shows a side view of a pneumatic tire 10 of the semi-hollow type according to the invention, which can also be described as a covering. The pneumatic tire 10 has an axis of revolution XX and is to be mounted on the periphery of a rotary support, here a wheel rim (not shown in FIG. 1).

FIG. 2 shows the profile of the semi-hollow pneumatic tire, that is to say the transverse section of that tire according to a plane passing through the axis of revolution XX.

Figure 1:
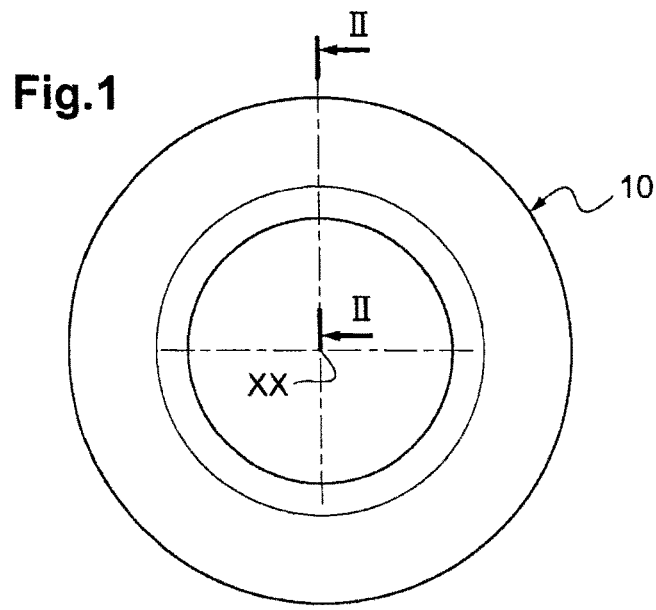
FIG. 1 is a side view of a semi-hollow pneumatic tire in an embodiment of the invention, in which the annular ridges have a smooth and continuous edge.

In this example, the pneumatic tire is to be mounted on the periphery of a wheel rim 12 composed of two flanges 14 having two annular portions 16 which delimit between them an annular slot 18 and form the seat of the wheel rim. Such a wheel rim is known especially from publication FR 2 933 903 already mentioned.

The semi-hollow pneumatic tire 10 comprises a sole 20 with a concave profile, which is to follow the shape of the annular portions 16 of the wheel rim 12. The sole 20 is extended in the middle by a T- or mushroom-shaped bead 22 which is to be maintained in the annular slot 18 between the two flanges 14. The two flanges 14 are preferably removable in order to allow the pneumatic tire to be mounted in a manner known per se.

The sole 20 here has a substantially semi-circular profile, which facilitates good envelopment of the sole at the periphery of the wheel rim. The sole 20 thus covers the seat of the wheel rim.

The semi-hollow pneumatic tire further comprises a tread 24 of concave shape, arranged opposite the sole.

The sole 20 and the tread 24 are connected by two sidewalls 26, which here have a convex profile. The sole 20, the tread 24 and the two sidewalls 26 together form a cover 28 which defines an uninflated chamber 30 inside the pneumatic tire. The cover is advantageously made of an elastomer material, for example of rubber. The chamber 30, which is not inflated, communicates with the external medium by at least one opening (not shown) in order to allow air to enter or leave the semi-hollow pneumatic tire, enabling its deformation.

The sidewalls 26 are connected to two end portions 32 of the sole 20 and are each provided with an annular ridge 34. The two ridges 34 extend the two sidewalls 26 in the outer radial direction, that is to say away from the axis of revolution XX. The two ridges 34 define two principal directions D which are not parallel, that is to say they are each inclined by the same angle relative to a median plane P perpendicular to the axis of revolution XX. These two directions intersect at an acute angle, as will be described hereinbelow with reference to FIGS. 3A and 3B.

Figure 2:
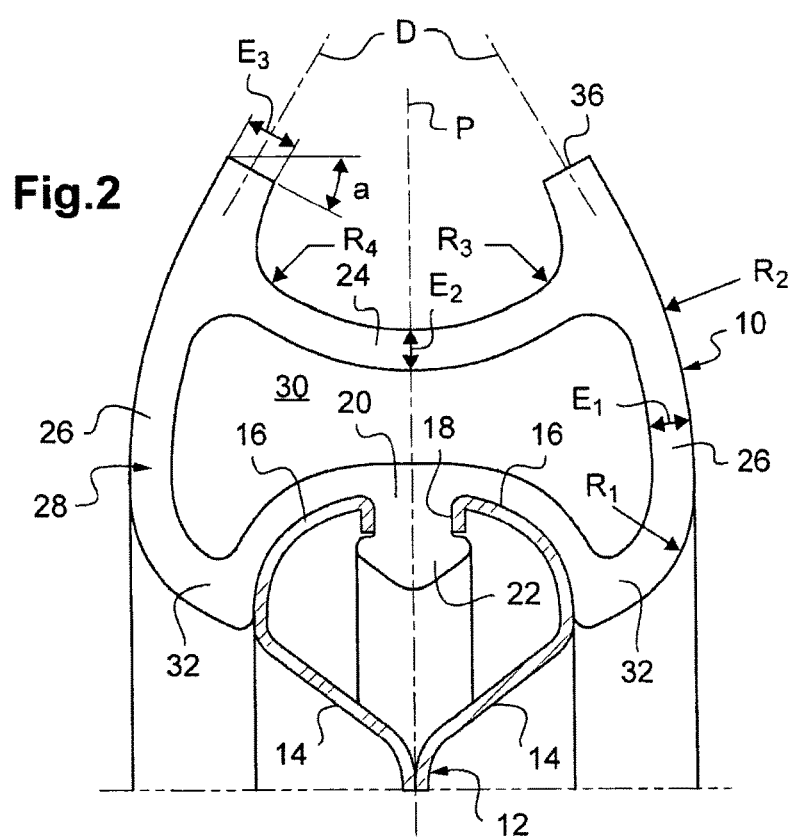
FIG. 2 is a sectional view on an enlarged scale according to line II-II of FIG. 1, the figure partially showing the rim on which the pneumatic tire is mounted.

In the example of FIGS. 1 and 2, each sidewall 26 and the annular ridge 34 that extends it have a profile of generally convex shape. This profile has a first radius of curvature $R_1$ in the region of the sidewall that is connected to the sole 20 and a second radius of curvature $R_2$, much larger than $R_1$, in the region of the sidewall and of its extension with the ridge 34.

Each annular ridge 34 has an end edge 36 which is smooth and continuous. The end edges 36 have, as seen in section, symmetrical gradients having an angle a of 30° in the example (FIG. 2).

Each sidewall 26 has a substantially constant thickness $E_1$ and, likewise, the tread 24 has a thickness $E_2$ which is substantially equal to $E_1$ in the example shown.

The concavity of the tread 24 is defined by a radius $R_3$, the value of which is intermediate between those of the radii $R_1$ and $R_2$. The tread is connected on the inside to the ridges by a rounded portion having a connection radius $R_4$ whose value is less than $R_3$.

As can be seen in FIG. 2, each annular ridge has a thickness which decreases gradually starting from a region of connection to the tread to an end edge 36, where it has a minimal thickness $E_3$.

The minimal thickness $E_3$ is here greater than each of the thicknesses $E_1$ and $E_2$ in order to contribute to the strengthening of the annular ridge.

Figure 3A:
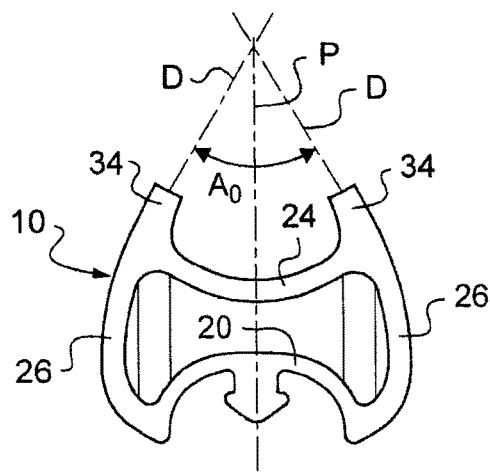
FIG. 3A is a sectional view analogous to FIG. 2 showing the profile of the pneumatic tire in the unloaded state.
Figure 3B:
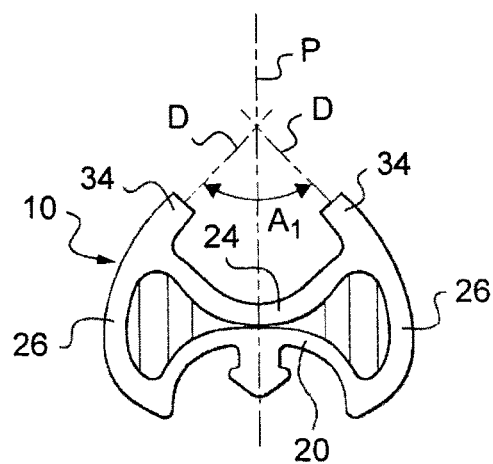
FIG. 3B is a sectional view analogous to FIG. 3A showing the profile of the pneumatic tire in the loaded state.

Reference will now be made to FIGS. 3A and 3B.

As can be seen in FIG. 3A, the annular ridges 34, in the at-rest configuration, that is to say when the pneumatic tire is in the unloaded state, jointly form an acute angle $A_0$ by their principal directions D. This means that each direction D forms an angle of $\frac{1}{2}A_0$ with the principal plane P. When the pneumatic tire is loaded (FIG. 3B), the annular ridges 34 move closer together locally in the horizontal direction, which causes a deformation of the tread 24, the concavity of which increases, that is to say the radius of curvature $R_3$ (FIG. 2) decreases.

As a result, the value of the angle changes from the value $A_0$ of FIG. 3A to the value $A_1$ of FIG. 3B, which is greater than the value $A_0$.

As the concavity of the tread 24 increases, the tread 24 moves closer to the sole 20 and may even come into contact therewith. There also results a deformation of the sidewalls 26 jointly with the annular ridges 34.

Figure 4A:
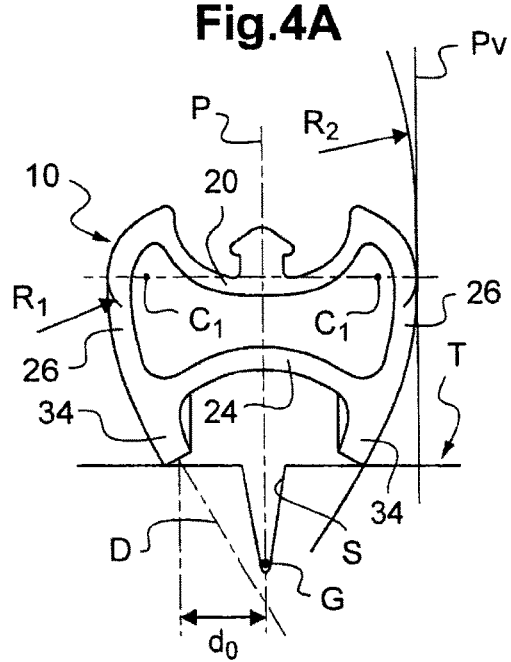
FIG. 4A is a sectional view analogous to FIG. 3A showing the pneumatic tire in the unloaded state disposed above a furrow that is to be closed.
Figure 4B:
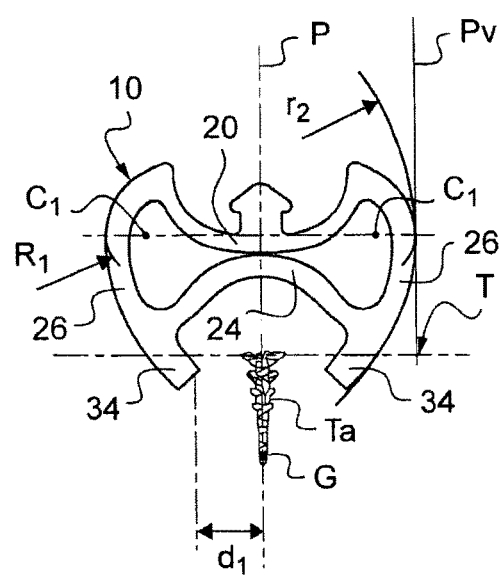
FIG. 4B is a view analogous to FIG. 4A in which the pneumatic tire is in the loaded state in order to close the furrow.

As can be seen in FIGS. 4A and 4B, each sidewall 26 and the annular ridge 34 that extends it are capable of pivoting jointly and locally under the effect of the load about a pivot point $C_1$ situated in a connection region between the sidewall and the sole, that is to say close to the ends 32 of the sole 20 (FIG. 2).

Each of the pivot points $C_1$ corresponds substantially to the center of the radius of curvature $R_1$ mentioned above and shown in FIG. 2. It will be seen that the two radii $R_1$ remain identical in the unloaded state (FIG. 4A) and in the loaded state (FIG. 4B), and that the pivot points $C_1$ each remain in the same place. By contrast, the radius of curvature $R_2$ described above in connection with FIG. 2 decreases and changes from the value $R_2$ in the unloaded state to a smaller value $r_2$ in the loaded state, while remaining tangent to a vertical plane Pv.

FIG. 4A shows the profile of the pneumatic tire 10 in the unloaded state in which the ridges 34 are resting on soil or earth T in which a furrow S has been dug and grains G have subsequently been buried. The pneumatic tire is disposed in such a manner that its plane of symmetry P is disposed vertically in the axis of the furrow. The vertical distance between each ridge (in the region of the point of intersection with the direction D) and the plane P is $d_0$.

In the loaded state, and as shown in FIG. 4B, the sidewalls 26 and the ridges 34 that extend them are deformed as explained above so that the ends of the ridges 34 move closer together, causing a pinching effect on the soil. Distance $d_0$ of FIG. 4 becomes distance $d_1$ of FIG. 4B, which is smaller than $d_0$. In other words, the tread 24 and the two ridges 34 together form a U-shaped profile, the bottom of which bends and the two limbs of which move closer together. By virtue of the pinching effect of the ridges 34, the loosened earth which was at the side of the furrow is buried therein, as shown by reference Ta in FIG. 4B.

Figure 5:
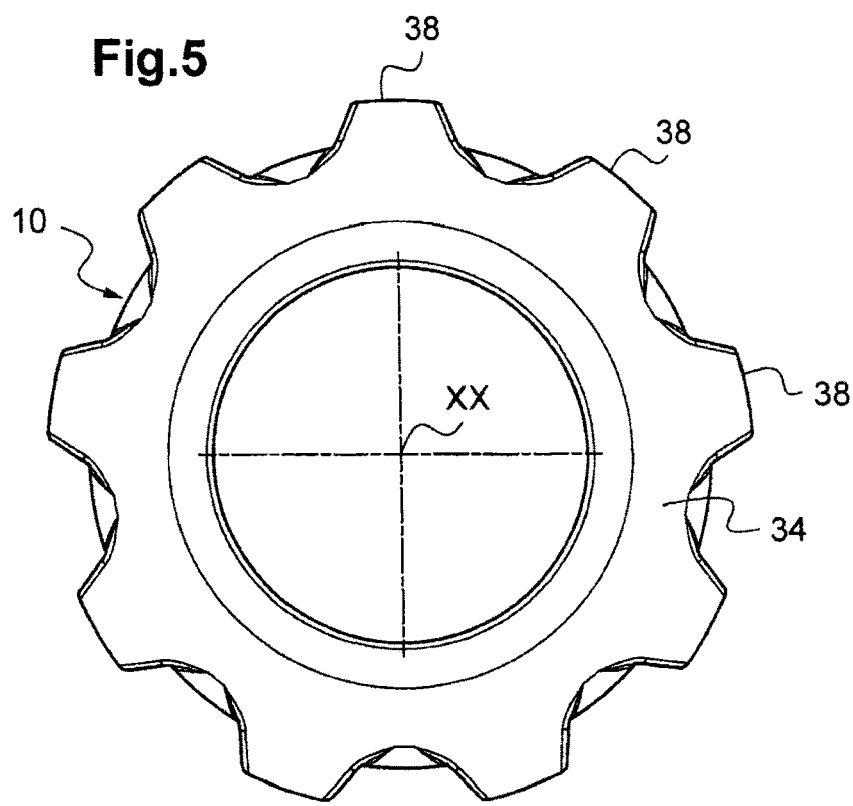
FIG. 5 is a side view of a semi-hollow pneumatic tire in a variant embodiment in which the annular ridges have indentations that are not offset.
Figure 6:
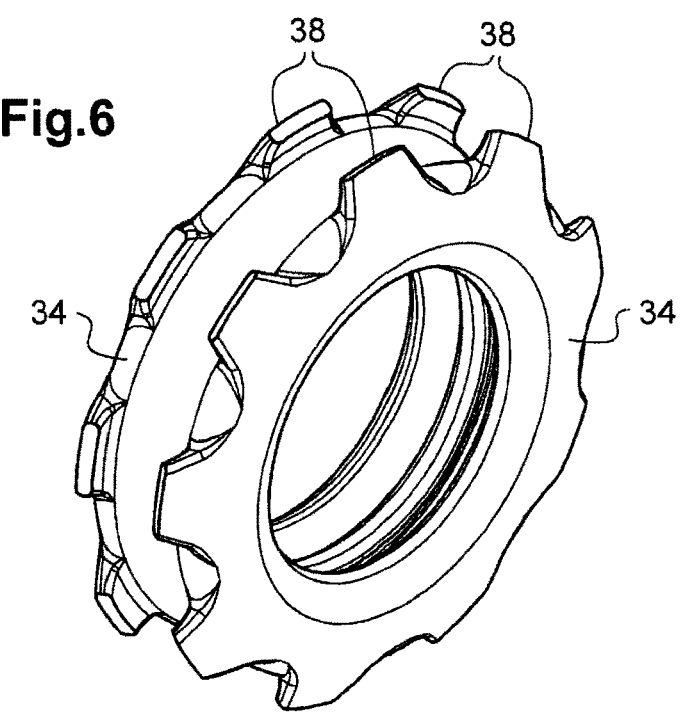
FIG. 6 is a perspective view of the pneumatic tire of FIG. 5.

FIGS. 5 and 6 show a variant embodiment of the pneumatic tire of the preceding figures, in which the profile, or cross-section, of the pneumatic tire is substantially the same as in FIG. 1.

The difference here is that the annular ridges 34 are each provided at their periphery with protrusions 38 in the form of teeth or notches. The indentations are identical and are evenly spaced, and there are nine of them in the example shown. The number of indentations may be different. In the example, these teeth have a generally trapezoidal shape when viewed from the side (FIG. 5).

As can be seen from FIG. 6, the protrusions 38 of the annular ridges 34 are aligned in directions parallel to the axis of revolution.

The presence of the protrusions 38 contributes towards facilitating the removal of the earth which has been able to accumulate between the two annular ridges 34 and also permits better punching of the soil as compared with ridges having smooth edges.

Figure 7:
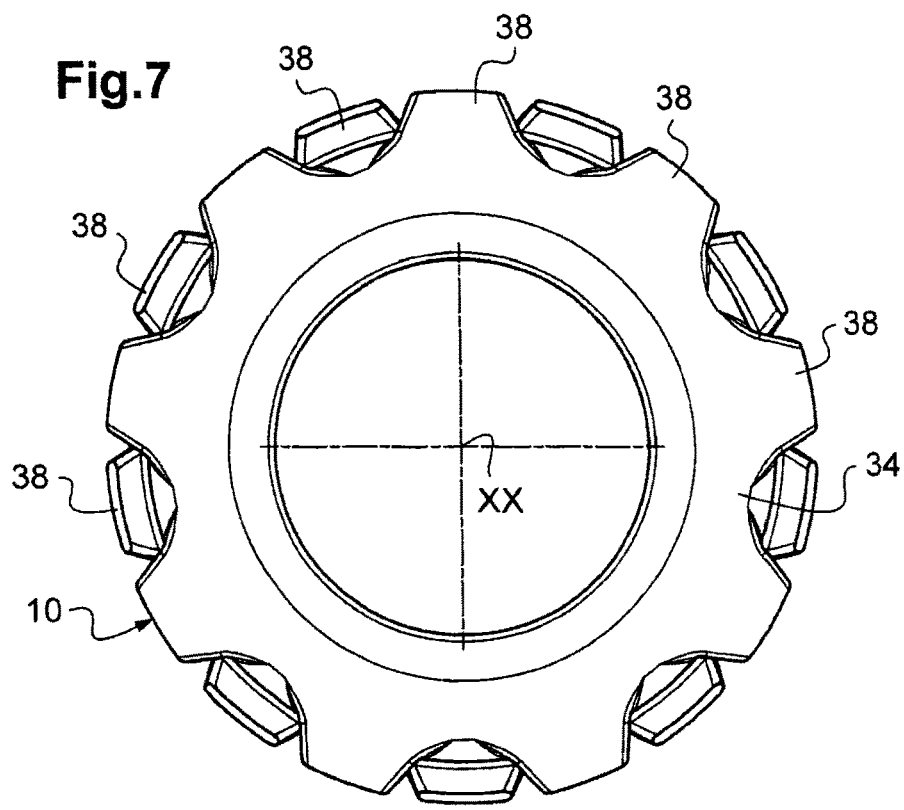
FIG. 7 is a side view of a semi-hollow pneumatic tire in a variant embodiment in which the annular ridges have indentations that are offset.
Figure 8:
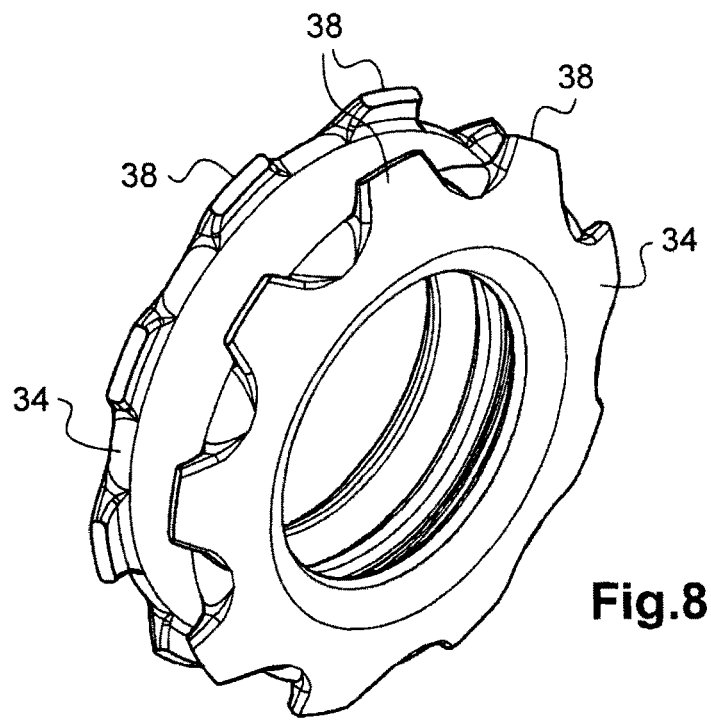
FIG. 8 is a perspective view of the pneumatic tire of FIG. 7.

FIGS. 7 and 8 show a variant embodiment of FIGS. 5 and 6. The profile of the transverse section of the pneumatic tire is substantially the same as in the preceding embodiment. The difference here is that the annular ridges 34 are provided with protrusions 38, of which there are still nine in the example, but which are offset in directions parallel to the axis of revolution XX.

Figure 9:
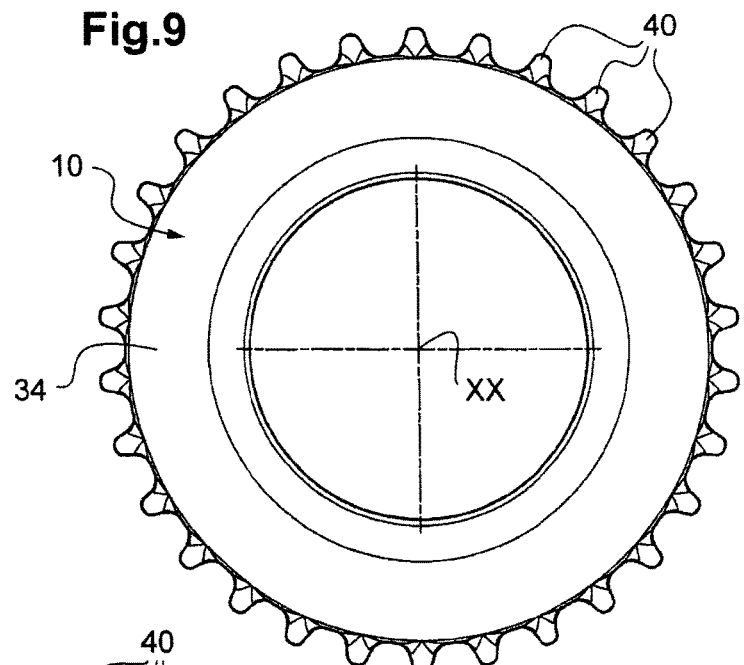
FIG. 9 is a side view of a semi-hollow pneumatic tire in a variant embodiment in which the indentations are in the form of aligned spikes.
Figure 10:
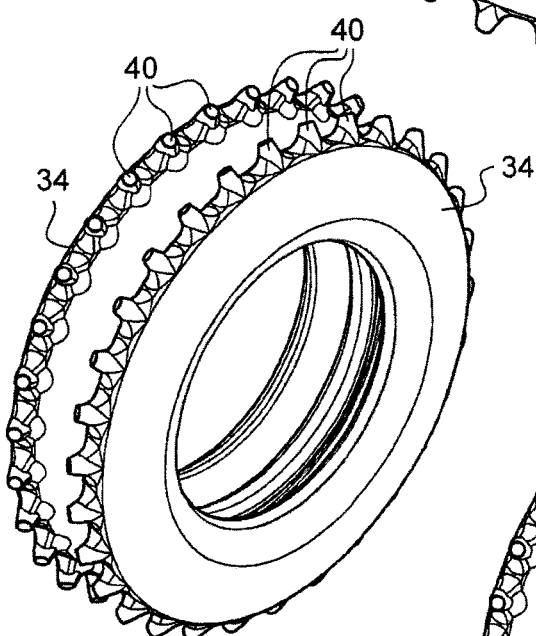
FIG. 10 is a perspective view of the pneumatic tire of FIG. 9.

FIGS. 9 and 10 show another variant embodiment in which each annular ridge comprises a plurality of indentations 40, of which there are thirty in the example. However, the indentations are here in the form of evenly spaced spikes or protrusions, each of which substantially has the shape of a truncated cone. In this embodiment, the indentations 40 are aligned in directions parallel to the axis of revolution XX.

Figure 11:
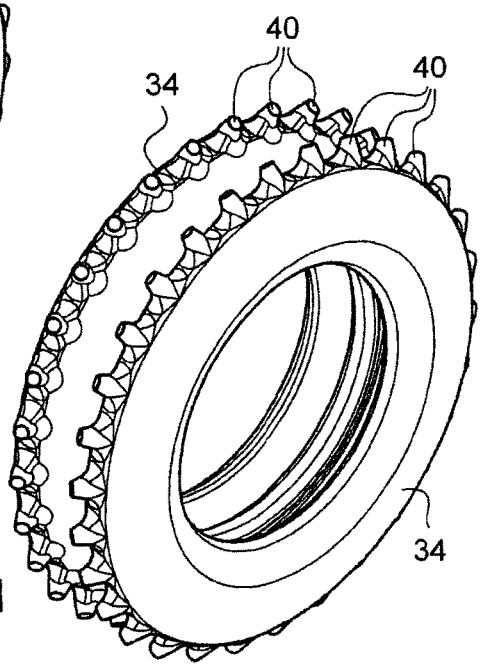
FIG. 11 is a view analogous to FIG. 10 in a variant embodiment in which the indentations are in the form of offset spikes.

FIG. 11 shows a variant embodiment. It differs from FIG. 10 in that the indentations 40, of which there are also thirty, are here offset in directions parallel to the axis of revolution.

Figure 12:
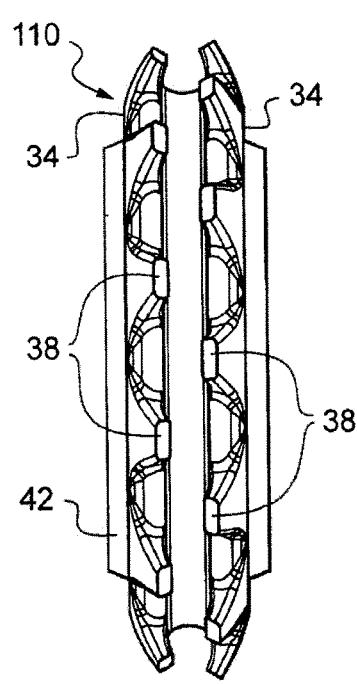
FIG. 12 is a front view of a semi-hollow pneumatic tire comprising sidewalls with an S-shaped profile, annular ridges with offset indentations, and a sole in the form of a sleeve.
Figure 13:
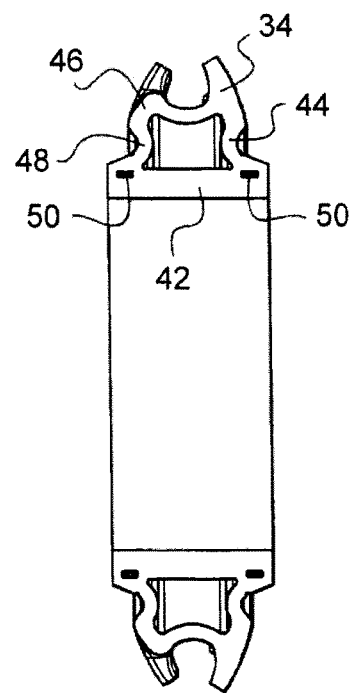
FIG. 13 is a view in axial section of the pneumatic tire of FIG. 12.
Figure 14:
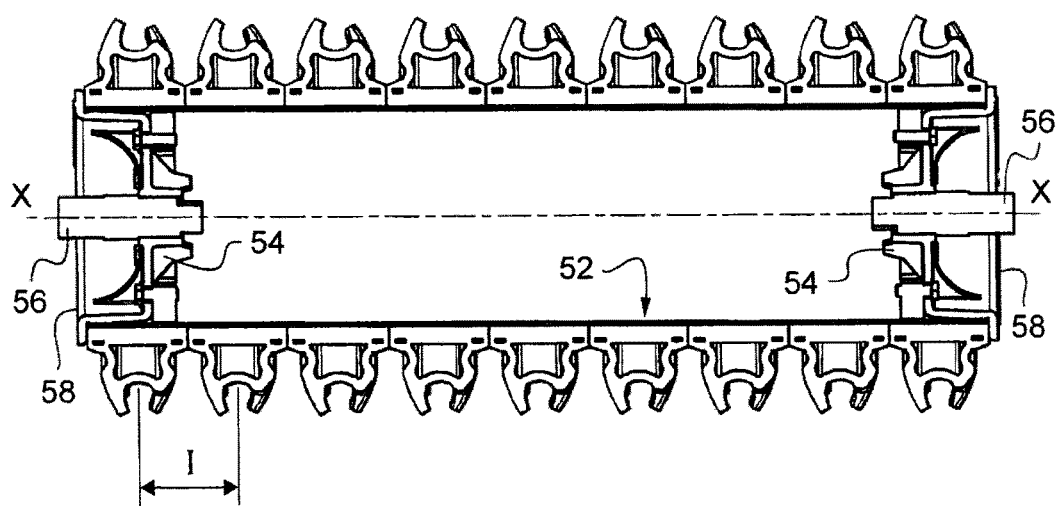
FIG. 14 is a view in axial section of a roller equipped with pneumatic tires according to FIGS. 12 and 13.

Reference will now be made to FIGS. 12 to 14. In this embodiment, the pneumatic tire 110 comprises a sole 42 which has a profile of planar shape according to a plane passing through the axis of revolution XX, which allows a cylindrical sleeve or sheath to be defined. In addition, each pneumatic tire comprises two sidewalls 44 having a generally S-shaped profile according to a plane passing through the axis of revolution. The S-shaped profile has a convex outer portion 46, which is extended by an annular ridge 34, and a concave inner portion 48, which is connected to the sole 42. In the example, each of the ridges 34 is provided with protrusions 38, in the form of trapezoidal teeth, which are offset in directions parallel to the axis XX.

As can be seen in FIG. 13, the sole 42 includes reinforcing rings 50 embedded in the mass of the material. These rings are intended to provide better holding of the sole around a rotary support.

Reference will now be made to FIG. 14, which shows the mounting of a plurality of pneumatic tires 110 according to FIGS. 12 and 13 slipped around a cylindrical tube 52 to constitute a roller. The cylindrical tube 52 is connected to two end cheeks 54 which support two shaft ends 56 arranged coaxially in the direction of an axis XX coincident with the axis of revolution of the pneumatic tires. The pneumatic tires are slipped contiguously around the cylindrical tube 52 and kept close together by two end flanges 58 which are fixed, respectively, to the two cheeks 54.

This arrangement allows a plurality of parallel furrows to be closed simultaneously. The pneumatic tires define in pairs a pitch or interval I, the value of which corresponds to the pitch of the furrows (not shown).

FIGS. 15 and 16 show an embodiment similar to that of FIGS. 12 and 13. As in the preceding embodiment, the pneumatic tire comprises a sole 42 forming a cylindrical sleeve. The sidewalls 44 of the pneumatic tire likewise have an S-shaped profile as in the preceding embodiment. Likewise, the ridges of the pneumatic tire comprise protrusions 38, of which there are twelve here, which are offset in directions parallel to the axis of revolution XX.

The main difference here is that the sole 42 in the form of a sleeve has a greater axial width, and the pneumatic tire also has a greater axial width.

The sole 42 includes three reinforcing rings 50 instead of two in the preceding embodiment.

FIGS. 17 and 18 show another embodiment in which the pneumatic tire comprises two sidewalls 44 having an S-shaped profile, and in which the annular ridges 34 each comprise protrusions 38 which are offset in directions parallel to the axis of revolution. There are twelve of these indentations.

Here, the pneumatic tire is to be mounted individually on a wheel rim analogous to that shown in FIG. 1. To that end, the pneumatic tire comprises a sole 20 having a profile analogous to that shown in FIG. 1, the sole likewise being provided with a bead 22.

Figure 19A:
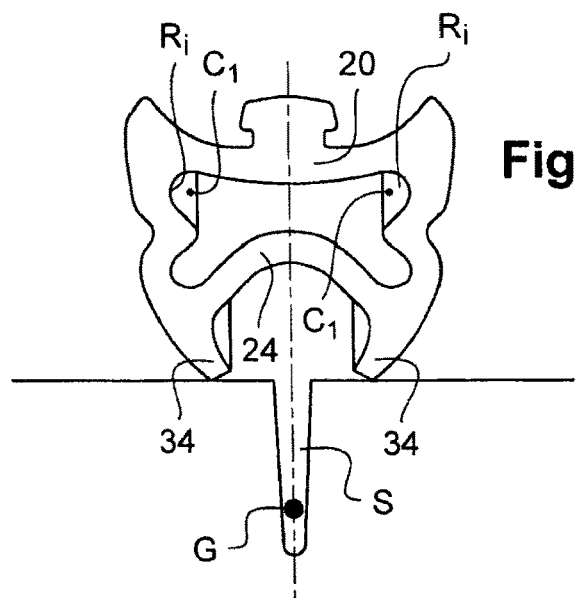
FIG. 19A shows the profile in the unloaded state of the pneumatic tire of FIG. 18 above a furrow.
Figure 19B:
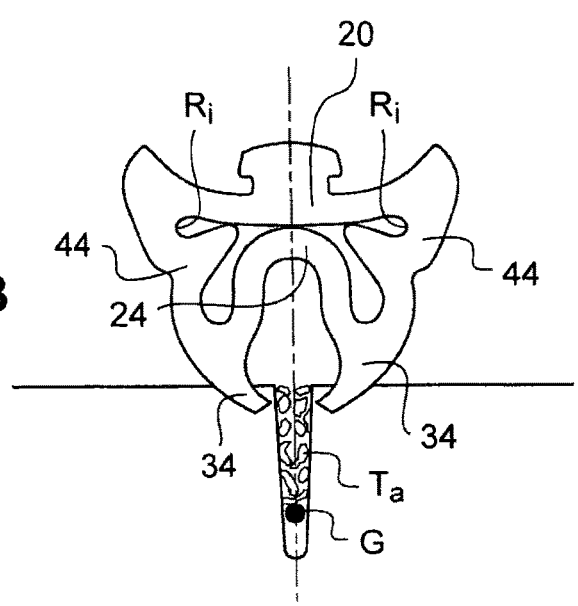
FIG. 19B is a view analogous to FIG. 19A in which the pneumatic tire is in the loaded state for closing the furrow.

FIGS. 19A and 19B show the profile of the pneumatic tire of FIGS. 17 and 18 in the unloaded state and in the loaded state, respectively, above a furrow S in which grains G have been buried. In the case of FIG. 19A, the profile of the pneumatic tire is not deformed and the annular ridges 34 are positioned on either side of the axis of the furrow in which the grains have been buried. The principal plane of the pneumatic tire corresponds substantially to the axis of the furrow.

In FIG. 19B, it will be seen that the pneumatic tire is deformed locally under the effect of the load. The annular ridges 34 move closer together in the horizontal direction in order to exert a pinching effect and fill the furrow with the loosened earth Ta as in the case of FIG. 4B. It will be seen that the S-shaped profile of the sidewalls 44 tends to become flattened, and that the tread 24 is also deformed, its concavity being increased. Here, the tread 24 comes into contact with the sole 20, as does the inner portion of the S-shaped profile.

The pivot point of each of the sidewalls 44 corresponds to the centre $C_1$ of the inner radius of curvature R in the region in which the sidewall 44 and the sole 20 are connected. This radius of curvature decreases with the change from the unloaded state to the loaded state.

Figure 20:
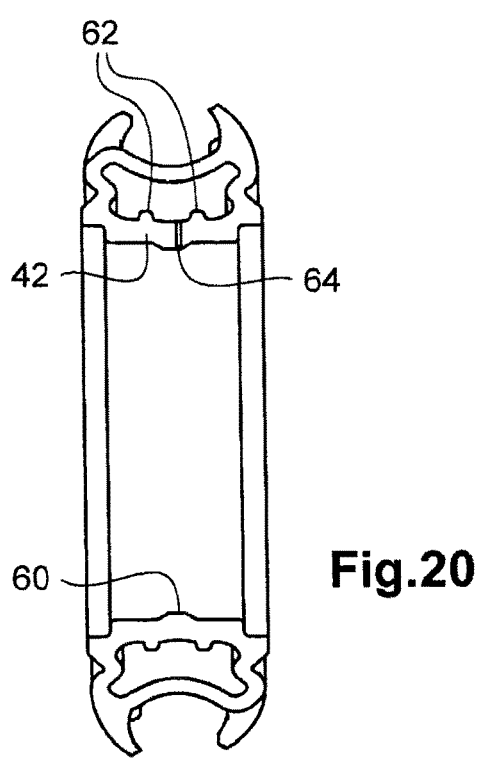
FIG. 20 is a view in axial section of a pneumatic tire in a variant embodiment.

FIG. 20 shows another embodiment in which the pneumatic tire likewise comprises sidewalls 44 having an S-shaped profile and in which the annular ridges 34 are provided with offset protrusions 38. The main difference relative to the embodiment of FIGS. 17 and 18 is that the sole 42 here forms a sheath for mounting on a wheel rim of a different structure. The sole carries a median annular rib 60 directed to the inside. On the opposite side, that is to say on the side of the inner chamber, the sole 42 comprises two annular ribs 62 which are to form stops for limiting the flattening of the pneumatic tire. It will also be seen in FIG. 20 that there passes through the sole, in its thickness, a hole 64 serving for the passage of air, in a manner known per se. This hole is produced at the time of manufacture of the pneumatic tire. It is present in all the pneumatic tires of the invention, as already mentioned.

The pneumatic tire of the invention is susceptible of numerous variant embodiments as regards its profile, that is to say the shape of its transverse section. It will be appreciated that the annular ribs of the pneumatic tire can be smooth or provided with indentations, which may or may not be offset. The sole which forms part of the pneumatic tire will be adapted according to the desired mounting, either on a wheel rim or on a roller.

The pneumatic tire of the invention is produced from elastomer material, advantageously of the rubber type.

The hardness of the pneumatic tire is chosen to confer thereon sufficient rigidity. Generally, a Shore hardness of between 50 and 70 will be preferred.

The pneumatic tire of the invention can be produced by various processes which are themselves known for the manufacture of semi-hollow pneumatic tires. It can be produced by extrusion of a strip cut to the desired length, the strip subsequently being made into a circular shape and joined by its ends. The strip of circular shape can then be placed inside a suitable mold, for example a mold having a plurality of sections, in order to confer thereon the chosen shape.

It is also possible to use an injection-molding process, especially by rotational molding.

The pneumatic tire of the invention can be used on agricultural machines, especially machines of the sowing machine type, or alternatively on machines for distributing fertilizers or the like which are to be buried in the soil.

The invention claimed is:

1. A semi-hollow pneumatic tire for an agricultural machine, having an axis of revolution and comprising:
a sole mountable on the periphery of a rotary support,
a tread opposite the sole, and
two sidewalls each connecting the sole and the tread so as to form together a cover which defines an uninflated chamber inside the pneumatic tire,
wherein the tread has a concave profile according to a plane passing through the axis of revolution, and
wherein the pneumatic tire comprises two annular ridges which are connected to two opposite ends of the tread and which extend beyond intersections of the sidewalls and the tread in the outer radial direction, the two annular ridges including end edges and defining, respectively, two principal directions which intersect the end edges perpendicularly and intersect one another at an acute angle so that, when the pneumatic tire comes into contact with soil, by being subjected to a vertical load, the two annular ridges move closer together locally in such a manner as to exert a pinching effect on the soil, causing an increase in the concavity of the tread and an increase in the angle.

2. A semi-hollow pneumatic tire for an agricultural machine, having an axis of revolution and comprising:
a sole mountable on the periphery of a rotary support,
a tread opposite the sole, and
two sidewalls each connecting the sole and the tread so as to form together a cover which defines an uninflated chamber inside the pneumatic tire,
wherein the tread has a concave profile according to a plane passing through the axis of revolution, and
wherein the pneumatic tire comprises two annular ridges which are connected to two opposite ends of the tread and which extend beyond intersections of the sidewalls and the tread in the outer radial direction, the two annular ridges including end edges and defining, respectively, two principal directions which intersect midpoints of the end edges perpendicularly and intersect one another at an acute angle so that, when the pneumatic tire comes into contact with soil, by being subjected to a vertical load, the two annular ridges move closer together locally in such a manner as to exert a pinching effect on the soil, causing an increase in the concavity of the tread and an increase in the angle.

3. The semi-hollow pneumatic tire as claimed in claim 2, wherein each sidewall and the annular ridge that extends it are pivotable jointly and locally under the effect of the vertical load about a pivot point situated in a connection region between the sidewall and the sole.

4. The semi-hollow pneumatic tire as claimed in claim 2, wherein each sidewall and the annular ridge that extends it have a profile of generally convex shape according to a plane passing through the axis of revolution.

5. The semi-hollow pneumatic tire as claimed in claim 2, wherein each sidewall has a generally S-shaped profile, according to a plane passing through the axis of revolution, the S-shaped profile having a convex outer portion, which is extended by an annular ridge, and a concave inner portion, which is connected to the sole.

6. The semi-hollow pneumatic tire as claimed in claim 2, wherein each annular ridge has a thickness which decreases gradually starting from a connection region with the tread to the end edge of the annular ridge, where it has a minimal thickness.

7. The semi-hollow pneumatic tire as claimed in claim 2, wherein each sidewall has a substantially constant thickness.

8. The semi-hollow pneumatic tire as claimed in claim 2, wherein each end edge is smooth and continuous.

9. The semi-hollow pneumatic tire as claimed in claim 8, wherein each annular ridge comprises protrusions.

10. The semi-hollow pneumatic tire as claimed in claim 9, wherein the protrusions are produced in the form of teeth of substantially trapezoidal shape.

11. The semi-hollow pneumatic tire as claimed in claim 9, wherein the protrusions are produced in the form of spikes having substantially the shape of cylindrical section.

12. The semi-hollow pneumatic tire as claimed in claim 9, wherein the protrusions of each annular ridge are aligned in directions parallel to the axis of revolution.

13. The semi-hollow pneumatic tire as claimed in claim 9, wherein the protrusions of each annular ridge are offset in directions parallel to the axis of revolution.

14. The semi-hollow pneumatic tire as claimed in claim 2, wherein each sole has a profile of concave shape according to a plane passing through the axis of revolution and is provided with a retaining bead which projects in the inner radial direction.

15. The semi-hollow pneumatic tire as claimed in claim 2, wherein each sole has a profile of planar shape according to a plane passing through the axis of revolution, in order to define a cylindrical sleeve.

16. The semi-hollow pneumatic tire as claimed in claim 2, wherein the pneumatic tire is formed from an elastomer material, in particular from a rubber.

17. The semi-hollow pneumatic tire as claimed in claim 16, wherein the elastomer material has a hardness of between 50 and 70 Shore.

\* \* \* \* \*